United States Patent
Hellberg et al.

(12) 
(10) Patent No.: US 6,498,849 B1
(45) Date of Patent: Dec. 24, 2002

(54) ARRANGEMENT IN A SUBSCRIBER LINE INTERFACE CIRCUIT

(75) Inventors: Henrik Hellberg, Solna (SE); Anders Emericks, Solna (SE)

(73) Assignee: Telefonaktiebolaget LM Ericsson, Stockholm (SE)

(*) Notice: Subject to any disclaimer, the term of this patent is extended or adjusted under 35 U.S.C. 154(b) by 0 days.

(21) Appl. No.: 09/678,676

(22) Filed: Oct. 4, 2000

(30) Foreign Application Priority Data

Oct. 4, 1999 (SE) ................................ 9903567

(51) Int. Cl.[7] ............................ H04M 1/00; H04M 9/00
(52) U.S. Cl. ........................... 379/399.01; 379/399.02; 379/398; 379/413
(58) Field of Search .................. 379/399, 413, 379/413.01, 413.02, 398

(56) References Cited

U.S. PATENT DOCUMENTS 5,737,411 A    4/1998  Apfel et al. ................. 379/399
5,801,520 A *  9/1998  Malmgren et al.
6,233,335 B1 * 5/2001  Ludeman
6,301,358 B1 * 10/2001 Chen et al.

FOREIGN PATENT DOCUMENTS

WO    99/26348    5/1999    .............. 379/399

* cited by examiner

Primary Examiner—Forester W. Isen
Assistant Examiner—Ramnandan Singh
(74) Attorney, Agent, or Firm—Burns, Doane, Swecker & Mathis, L.L.P.

(57) ABSTRACT

To reduce power losses in a SLIC comprising first and second current amplifiers supplying line current to respective wires of a two-wire transmission line to a load, a line current detector detects line currents below a threshold value. For line currents above the threshold value, the second amplifier is supplied from a first battery with a substantially constant voltage. A voltage regulator is connected with its output terminal to the second amplifier, with its current supply terminal to a second battery of higher absolute voltage than said first battery, and with its input terminal to the detector. In response to line currents below said threshold value, the detector outputs control signals proportional to the detected line currents to control the output terminal of the voltage regulator to supply the second amplifier as well as the load from the second battery.

7 Claims, 2 Drawing Sheets

ARRANGEMENT IN A SUBSCRIBER LINE INTERFACE CIRCUIT

TECHNICAL FIELD

The invention relates generally to subscriber line interface circuits and more specifically to an arrangement in a subscriber line interface circuit for switching the line current between two different DC voltage sources to reduce power losses in the subscriber line interface circuit

BACKGROUND OF THE INVENTION

A subscriber line interface circuit (SLIC) that is to drive a two-wire transmission line to a load, has a feed characteristic such that the line voltage and the line current are functions of the line load.

When the line is open, i.e. in an on-hook condition of the load, the line is supplied with a maximum voltage at the same time as the current is zero. In a manner known per se, a supply voltage, that is somewhat higher than the required line voltage, has to be available to the SLIC, When the line is loaded, i.e. in an off-hook condition of the load, the line voltage will decrease and the line current will increase in response to the line resistance plus the load resistance.

The difference between the supply voltage and the line voltage will be applied across the SLIC, The current through the SLIC and the voltage across the same will cause power losses in the SLIC.

The power loss in the SLIC reaches its maximum for short lines, i.e. for low values of line resistance plus load resistance.

In some applications, e.g. so-called NT (Network Terminal) and TA (Terminal Adapter) applications, the lines are extremely short To keep the power losses low, these short lines should be supplied with as low supply voltages as possible. At the same time, there is a requirement to supply a considerably hither voltage when the line is open, since there may be equipment that needs this higher voltage in order to detect an on-hook condition of the load.

There are solutions where two supply voltages are applied to the SLIC, namely one battery voltage of a lower absolute value to sink the line current in an off-hook condition of the load, and one battery voltage of a higher absolute value to sink the line current in an on-hook condition of the load.

By current-limiting the higher battery in different ways, it has been attempted to control the current to or from that battery, Another way is to switch the current to the higher battery by means of an internal or external switch when the current has reached a suitable value.

When the current is switched, it is required that the decision level for switching has a hysteresis. Otherwise, one can end up in a situation where the switch just goes on switching between the batteries. Moreover, switching between different voltages results in a step function change of the supply voltage to the SLIC, which causes disturbances.

SUMMARY OF THE INVENTION

The object of the invention is to eliminate the problems with the known solutions.

This is attained in that two batteries are connected to the SLIC in accordance with the invention.

One battery of lower absolute value than the other battery is connected to the cathode of a diode whose anode is connected to a voltage regulator connected so that it can be controlled by a control signal. Upon a control signal, the voltage regulator can sink current to the battery of higher absolute value.

When the line voltage is lower than die value of the lower battery, the line cent flows to the interconnection point between the diode and the voltage regulator and via the diode to the lower battery. When the load of the line increases, the line voltage will increase and the line current will decrease, At a certain line current threshold, a control signal will be sent to the voltage regulator so that it begins to sink line current to the higher battery, The diode that is connected to the lower battery, will be reverse biased and all line current flows via the voltage regulator to the higher battery.

If the line voltage continues to increase, the control signal will cause the output terminal of the voltage regulator to follow it accordingly. The output terminal of the voltage regulator will continue to follow line voltage changes until the voltage on its output terminal comes close to the value of the higher battery. There, the voltage regulator will be locked and the line current will be reduced to zero when the line voltage has reached the on-hook voltage.

In this manner, the line current is restricted to the higher battery so that the power losses will be as small as possible. At the same time, the requirements on a high on-hook voltage will be fulfilled. An oscillation, where the line current alternately is switched between the higher and the lower battery, is avoided in that there will be a defined feed characteristic for line currents in the range below the switching threshold,

BRIEF DESCRIPTION OF THE DRAWINGS

The invention will be described more in detail below with reference to the appended drawings, on which.

DETAILED DESCRIPTION OF THE INVENTION

In an off-hook condition, each SLIC has a fixed line load depending on the length of the line and its load. In an on-hook condition, the load is, in principle, infinite. The operating range of the invention lies between these two conditions. In the following description, the line load will be varied from zero C to infinity.

Figure 1:
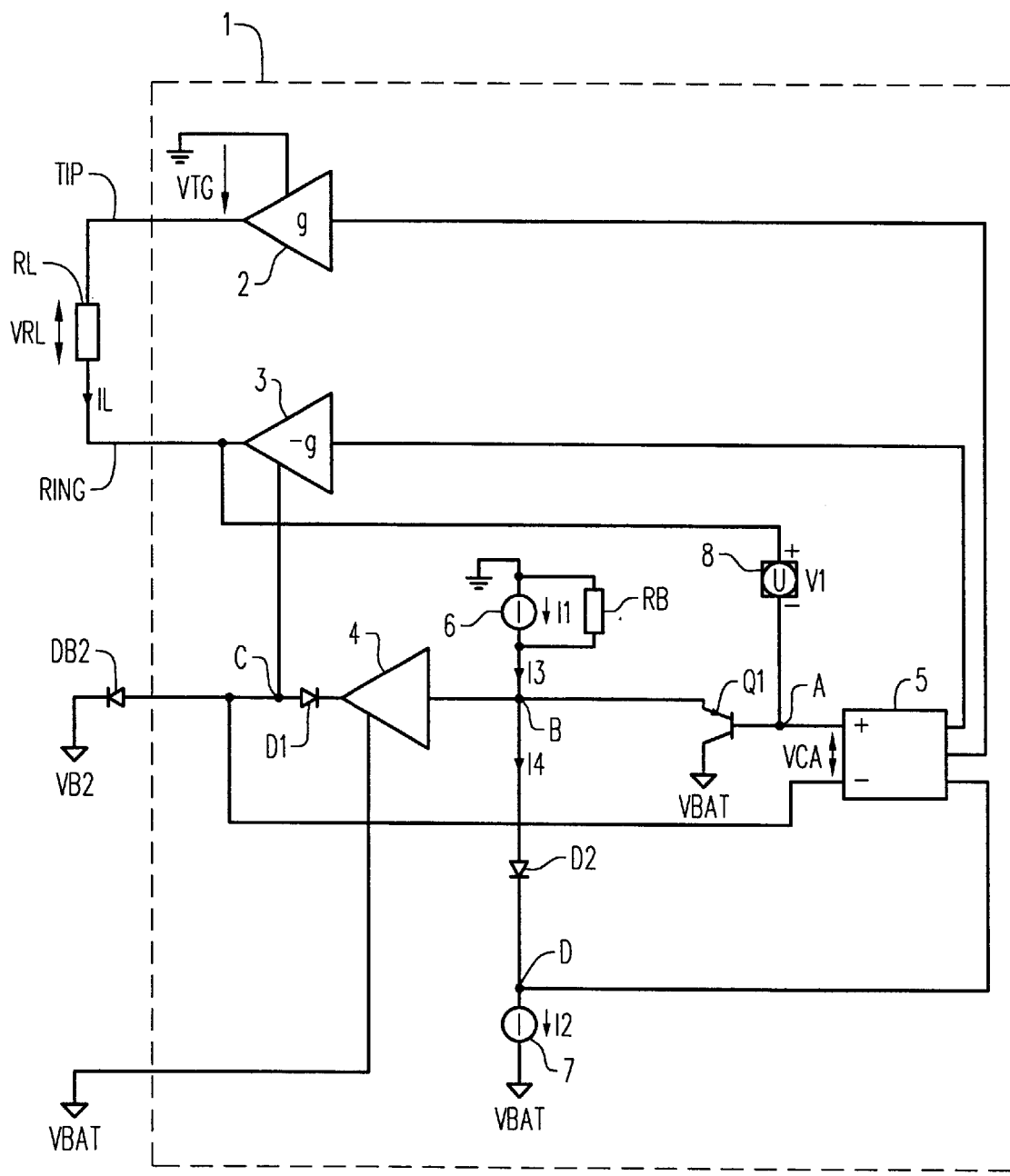
FIG. 1 illustrates one embodiment of the invention.

FIG. 1 illustrates an embodiment of an arrangement in accordance with the invention, In a SLIC 1, two current amplifiers 2, 3 are connected with their output terminals to respective wires TIP and RING of a two-wire transmission line to a load RL.

The current amplifier 2 connected with its output terminal to the TIP wire, is connected with its current supply terminal to ground.

The current amplifier 3 connected with its output terminal to the RING wire, is connected with its current supply terminal to a node C between anodes of two diodes D1, DB2. The cathode of the diode DB2 is connected to a DC voltage source or VB2, e.g. a battery, and the cathode of the diode D1 is connected to an output terminal of a voltage regulator 4. The voltage regulator 4 is connected with its current supply terminal to a DC voltage source VBAT, e.g.

a battery, of higher absolute voltage value than the battery VB2. The input terminal of the voltage regulator 4 is connected to a node B. A current source 6 generating a current I1 is connected in parallel with a resistor RB between the node B and ground, to supply a current I3 to the node B. A transistor Q1 is connected with its emitter to the node B, with its collector to the battery VBAT and with its base to a node A.

The output terminal of the current amplifier 3, i,e. the RING wire, is connected to the node A via a voltage source 8 generating a voltage V1 between the RING wire and the node A.

A voltage-to-current converter 5 is connected with its positive input terminal to the node A, with its negative input terminal to the node C, with a first current output terminal to the input terminal of the current amplifier 2, with a second current output terminal to the input terminal of the current amplifier 3, and with a third current output terminal to a node D. The node D is connected to the battery VBAT via a current source 7 that generates a current I2.

The node D is also connected to the cathode of a diode D2, whose anode is connected to the node B. A current I4 will flow through the diode D2.

If RL=0Ω, a line current IL will flow through the load RL. The line current is supplied from ground via the current amplifier 2 through the load RL and via the current amplifier 3 to the node C under control of the respective output currents from the voltage-to-current converter 5. From the node C, the current IL will flow to the battery VB2 through the diode DB2.

The voltage on the TIP wire is constantly maintained at a negative voltage VTG in order to keep the current amplifier 2 from becoming saturated.

The voltage source 8 is connected with its positive terminal to the RING wire and with its negative terminal to the node A, to generate the voltage V1 between the RING wire and the node A.

The transistor Q1 connected with its base to the node A and with its emitter to the node B, controls the voltage regulator 4. The emitter of the transistor Q1 is supplied with current from the current source 6, The resistor RB, connected in parallel with the current source 6, has very high impedance. The voltage across the resistor RB generates a current that together with the current I1 from the current source 6 forms the current I3 that flows through the transistor Q1 to the battery VBAT.

The output terminal of the voltage regulator 4 is controlled to a certain voltage value that is negative relative to the voltage on the RING wire, and is set by the voltage V1 generated by the voltage source 8 minus the emitter-base voltage across the transistor Q1.

Thus, the voltage on the output terminal of the voltage regulator 4 follows the voltage on the RING wire.

The diode D1 connected with its anode to the node C and with its cathode to the output terminal of the voltage regulator 4, is supposed to be an ideal diode, i.e. it has a high breakdown voltage and no forward voltage drop.

When RL=0, the RING wire will be at the same voltage as the TIP wire. The output terminal of the voltage regulator 4 will then be at about the voltage V1 below the RING wire voltage.

Thus, the diode D1 will be reverse biased since the node C will be at a diode voltage above the battery voltage VB2.

The voltage-to-current converter 5 is connected with its positive input terminal to the node A and with its negative input terminal to the node C. In FIG. 1, the voltage difference between the positive input terminal and the negative input terminal is denoted VCA.

On the three current output terminals of the voltage-to-current converter 5, currents proportional to the conversion factor of the voltage-to-current converter 5 are supplied to the current control input terminals of the current amplifiers 2 and 3 as well as to the node D. The current amplifiers 2, 3 have gains g and -g, respectively. The currents that are supplied to the input terminals of the current amplifiers 2 and 3 are amplified by the respective current amplifier 2, 3 and form the line current IL. From the current supplied by the voltage-to-current converter 5 to the node D, the current source 7 draws the current I2, When RL=0. the current from the voltage-to-current converter 5 to die node D is larger than I2. As long as the current I2 is smaller than the current from the voltage-to-current converter 5 to the node D, no current is drawn through the diode D2 interconnected between the nodes D and B, i.e. I4=0.

Thus, the voltage VCA will set the line current IL.

When RL=0, the voltage VCA will be the voltage in the node A minus the voltage in the node C. The voltage in the node A relative to ground will be set by VTG minus |VRL| that is zero, minus |V1|.

The node C is constantly clamped to a voltage corresponding to a diode voltage above VB2. Thus, the voltage VCA is at a maximum when RL=0. This is also the voltage at hand to feed the line. If RL increases, this voltage has to be distributed between VLR and VCA, since VTG and V1 are constant. When RL increases, the voltage VRL will increase. Therefore, the voltage on the RING wire will be pushed down towards the voltage VB2. The voltage on the TIP wire stays fixed. The voltage in the node A, that follows the voltage on the RING wire will drop down by the same amount. The same is true for the voltage on the output terminal of the voltage regulator 4. The voltage of the node C is fixed, which causes the voltage VCA to drop.

Figure 2A:
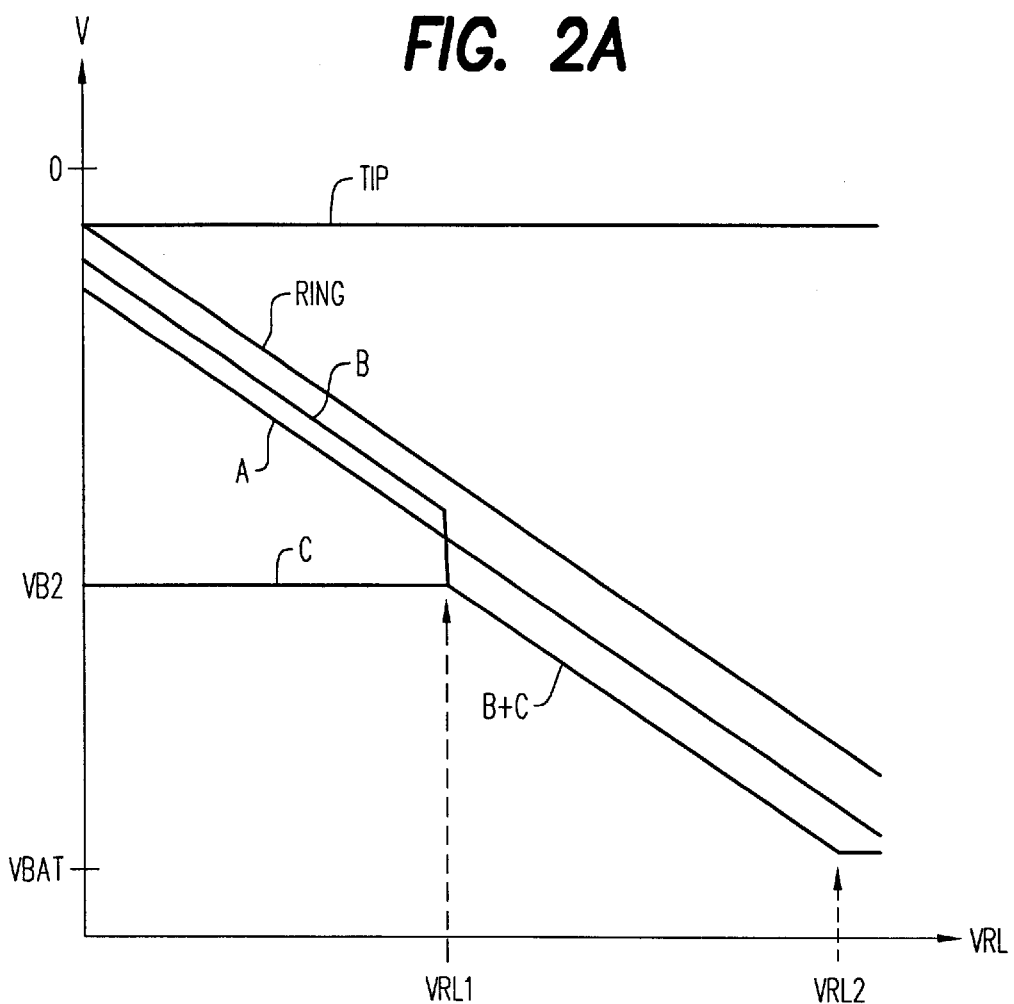
FIGS. 2A and 2B are diagrams illustrating the operation of the embodiment in FIG. 1.

From FIG. 2A, it is apparent how the distance between the nodes A and C diminishes up to the point VRL1.

The output currents from the voltage-to-current converter 5 also diminishes, and thereby also the line current IL as well as the current to the node D.

Figure 2B:
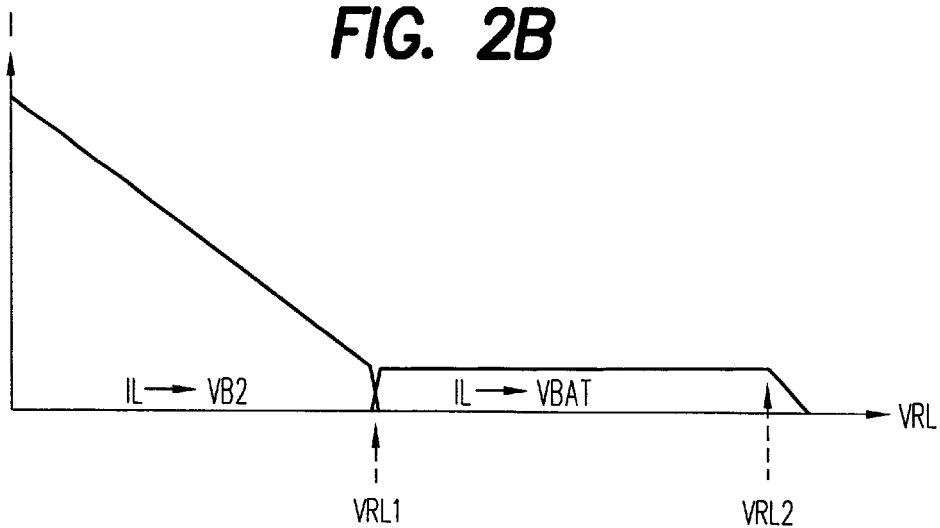

From FIG. 2B, it is apparent that the line current IL diminishes at the same time up to the line voltage VRL1.

If RL continues to increase, this will cause IL to be further reduced.

Finally, the current from the voltage-to current converter 5 to the node D will be less than the current I2 drawn by the current source 7.

Now, the current I4 will be drawn through the diode D2 from the node B. The current through the emitter of the transistor Q1 will be reduced by the same amount as drawn by the current I4.

In FIG. 2A, we are now getting closer to the voltage VRL1. The voltage in the node B will be pulled down towards the voltage of the node C.

At a certain value of RL, i.e. at a certain value of the load current IL, the current I4 drawn from the node B will be equal to the current I3. The emitter current of the transistor Q1 will now be zero. The emitter voltage collapses and the input terminal of the voltage regulator 4 will be pulled down so that the diode D1 will be forward biased and the line current will flow into the voltage regulator 4. At the same time, the diode DB2 will be reverse biased. The voltage regulator 4 will sink the line current IL to the battery VBAT.

In FIG. 2B, it is indicated that, at the line voltage VRL1, the line current IL is moved from the battery VB2 to the battery VBAT.

Up to now, the power in the SLIC has been generated between ground and the voltage of the battery VB2. By determining in this manner at which value of the line current IL, a switch to the battery VBAT should be made, the power generation in the SLIC can be optimized. The battery VBAT can never sink more current than the current that has been chosen as threshold.

By choosing suitable values for the currents I3 and I2, this switching of the line current IL can be programmed to take place at a fixed IL value, When RL increases, the line current IL will for a moment remain at the previous value. The voltage VRL across RL will increase and the voltage of the RING wire and the node A will be pushed down by the same amount. The same is true for the positive input terminal of the voltage-to-current converter 5. The voltage in the node C will remain, which causes the voltage VCA to diminish. The output currents from the voltage-to-current converter 5 will also diminish. When the current into the node D diminishes, the current I4 through the diode D2 increases. The voltage in the node B is pulled down and thereby, also the voltage on the output terminal of the voltage regulator 4 is pulled down. The voltage in the node C that follows the output voltage of the voltage regulator 4 is also pulled down and the voltage VCA begins to increase. Hereby, the output currents from the voltage-to-current converter 5 increase. When the current into the node D increases, the current I4 through the diode D2 decreases, The decrease of the voltage in the node B will stop as will the voltage in the node C. When everything is stabilized, the voltage VRL has increased and the voltage in the node C has been moved by the same amount.

Thus, a control system is obtained where the voltage in the node C follows all changes of the voltage across the load RL.

The current I3 sets the desired value while the current I4 defines the actual value.

The sensing or detection of the actual value is done by means of the voltage-to-current converter 5 that senses voltage differences between the nodes C and A, and converts these voltage differences to three proportional currents. Thus, different currents will be supplied to the node D in response to these voltage differences, The voltage VCA is so controlled that the current I3 and the current I4 balance each other. If the voltage VCA diminishes, e.g. when the RING wire voltage is pulled down, the current I4 will increase and the voltage of the nodes B and C will be pushed down. The opposite takes place when the RING wire voltage is pulled up.

The impedance in the node B is high, ideally as two opposite current sources. In FIG. 1, the resistor RB represents that impedance. If node B is changed from a voltage point of view, the current I3 is also changed. To balance this, the current I4 has to be changed The voltage VCA is changed and thereby IL is changed. Thus, another feed characteristic is generated with a considerably higher conversion factor than the previous. If RB is very high, this means that the current change on the line is small relative to the changed voltage. This can be seen in FIG. 2B, where the current is shown as an almost constant current. However, the current has a resistive slope, which is important in order to avoid oscillations where the line current is alternately switched between the two batteries. This could take place for values of RL where the line current is below the switching value.

If RL continues to increase, the voltages on the RING wire, as well as in node A, node B and node C will move downwards by the same amount towards VBAT. VBAT will sink the line current. In the end, the current source 7 will be saturated but will continue to sink the current I4=I3 through the diode D2. In principle, the node D will be at the same voltage as VBAT. The voltage in the node B will stop at about a diode voltage above VBAT. When RL now increases, the nodes B and C cannot move downwards any more and the control loop will be broken. The voltage VCA diminishes and the same is true for the output currents from the voltage-to-current converter 5. The line current IL is reduced, as apparent from FIGS. 2A and 2B at the voltage VRL2.

When RL=∞, i.e. in an on-hook condition, the output currents of the voltage-to-current converter 5 has been fully extinguished. Therefore, IL is zero and the voltage VRL is determined by |VBAT| minus |VTG| minus the voltage between the RING wire and VBAT, The voltage between the RING wire and VBAT is set by the voltage in the node C that is set by the voltage in the node D plus the diode voltage across the diode D2, plus the voltage VCA that is zero, plus the voltage |V1|.

In the embodiment described above with reference to FIG. 1, the control currents from the voltage-to-current converter 5 to the current amplifiers 2, 3 are used to indirectly detect the line current IL and compare it with a predetermined threshold value. It should be pointed out that, of course, it is possible to instead detect the line current directly, e,g. by directly detecting the current in the two-wire transmission line or in the current supply terminals of the current amplifiers 2, 3.

With knowledge of the conversion factor of the voltage-to-current converter, the line current at a certain line voltage can be determined since every value of the line current corresponds to a specific line voltage. Thus, it is possible to indirectly determine the line current by sensing the line voltage.

Instead of the voltage regulator 4 and the diode D1 shown in FIG. 1, a PNP transistor can be used. The PNP transistor (not shown) would then be connected with its emitter to the node C, with its collector to the battery VBAT, and with its base to the node B.

As should be apparent from the above, by means of the arrangement according to the invention, it will be possible to reduce the power losses in a SLIC.

What is claimed is:

1. In a subscriber line interface circuit comprising a first and a second current amplifier connected with their output terminals to respective wires of a two-wire transmission line to a load, wherein the first current amplifier is connected with its current supply terminal to ground, an arrangement for automatically switching the current supply terminal of the second current amplifier between different DC voltage sources to reduce power losses in the subscriber line interface circuit, wherein a line current detecting device is connected to detect line currents below a threshold value, the current supply terminal of the second current amplifier is connected to an output terminal of a voltage regulator, and, via a diode, to a first battery to normally be supplied from said first battery with a substantially constant voltage for line currents above the threshold value, the voltage regulator is connected with its current supply terminal to a second battery of higher absolute voltage than said first battery, and with its input terminal to an output terminal of the line current detecting device, the line current detecting device, in response to line currents below said threshold value, is adapted to output control signals that are proportional to the detected line currents to control the output terminal of the voltage regulator to voltages to reverse bias the diode and to supply the current supply terminal of the second current amplifier as well as the load with a unique voltage for every value of the line current below said threshold value.

2. The arrangement as claimed in claim 1, wherein to detect line currents below a threshold value, the line current detecting device is connected to detect control currents to the first and the second current amplifier.

3. The arrangement as claimed in claim 1, wherein to detect line currents below a threshold value, the line current detecting device is connected to directly detect the currents on the line.

4. The arrangement as claimed in claim 1, wherein to detect line currents below a threshold value, the line current detecting device is connected to detect supply currents to said first and/or second current amplifier.

5. The arrangement as claimed in claim 1, wherein to detect line currents below a threshold value, the line current detecting device is adapted to sense the line voltage.

6. The arrangement as claimed in claim 1, wherein the output terminal of the voltage regulator is connected to the current supply terminal of the second current amplifier via a second diode.

7. The arrangement as claimed in claim 1, wherein the voltage regulator is a PNP transistor that is connected with its emitter to the current supply terminal of the second current amplifier, with its collector to the second battery, and with its base to the output terminal of the line current detecting device.

\* \* \* \* \*